(12) United States Patent
Watanabe et al.

(10) Patent No.: US 7,993,818 B2
(45) Date of Patent: Aug. 9, 2011

(54) OPTICAL DISK MANUFACTURING METHOD

(75) Inventors: Hidetoshi Watanabe, Chiba (JP); Shoji Akiyama, Saitama (JP)

(73) Assignee: Sony Corporation, Tokyo (JP)

( * ) Notice: Subject to any disclaimer, the term of this patent is extended or adjusted under 35 U.S.C. 154(b) by 718 days.

(21) Appl. No.: 11/613,062

(22) Filed: Dec. 19, 2006

(65) Prior Publication Data

US 2007/0145614 A1 Jun. 28, 2007

(30) Foreign Application Priority Data

Dec. 22, 2005 (JP) ................................. 2005-370204

(51) Int. Cl.
*B29D 17/00* (2006.01)
(52) U.S. Cl. .......................... 430/321; 264/1.36; 264/2.2
(58) Field of Classification Search .................. None
See application file for complete search history.

(56) References Cited

U.S. PATENT DOCUMENTS

| | | | | |
|---|---|---|---|---|
| 4,907,956 A | * | 3/1990 | Ezaki et al. | 425/110 |
| 5,281,372 A | * | 1/1994 | Hayashi et al. | 264/1.33 |
| 5,336,529 A | * | 8/1994 | Schafer | 427/487 |
| 6,667,952 B2 | * | 12/2003 | Komaki et al. | 369/275.5 |
| 6,801,293 B1 | * | 10/2004 | Nishiyama et al. | 349/187 |
| 2004/0004300 A1 | * | 1/2004 | Yamaguchi et al. | 264/1.33 |
| 2004/0179463 A1 | * | 9/2004 | Yamasaki et al. | 369/275.4 |

FOREIGN PATENT DOCUMENTS

| | | | |
|---|---|---|---|
| JP | 59-232826 | * | 12/1984 |
| JP | 61-292244 | * | 12/1986 |
| JP | 01-235628 | * | 9/1989 |
| JP | 05-002784 | | 1/1993 |
| JP | 2003-022586 | * | 1/2003 |
| JP | 2003-91868 | | 3/2003 |
| JP | 2003-296978 | * | 10/2003 |
| JP | 2004-071124 | | 3/2004 |
| JP | 2004-164726 | * | 6/2004 |
| JP | 2005-332493 | | 12/2005 |
| WO | 00/72318 | | 11/2000 |
| WO | 2004/064055 | * | 7/2004 |
| WO | 2005/088629 | * | 9/2005 |

OTHER PUBLICATIONS

Komoro et al. Imprint characteristics by photoinduced solidication of liquid polymer, Jpn. J. Appl. Phys., vol. 39, Pt 1(12B) pp. 7075-7079 (2000).*
Japanese Office Action issued on Dec. 22, 2009, for corresponding Japanese Patent Application 2005-370204.

* cited by examiner

*Primary Examiner* — Martin J Angebranndt
(74) *Attorney, Agent, or Firm* — K&L Gates LLP (57) ABSTRACT

A method for manufacturing an optical disk having a middle layer on a substrate includes the steps of coating an ultraviolet curing resin over the substrate, irradiating ultraviolet rays to the ultraviolet curing resin and prepolymerizing the ultraviolet curing resin, and forming the middle layer by pressing a stamper against the prepolymerized ultraviolet curing resin, irradiating ultraviolet rays to the ultraviolet curing resin and thus curing the ultraviolet curing resin.

6 Claims, 8 Drawing Sheets

OPTICAL DISK MANUFACTURING METHOD

CROSS REFERENCES TO RELATED APPLICATIONS

The present application claims priority to Japanese Patent Application JP 2005-370204 filed in the Japanese Patent Office on Dec. 22, 2005, the entire contents of which is being incorporated herein by reference.

BACKGROUND

The present disclosure relates to an optical disk manufacturing method and, in particular to an optical disk manufacturing method, which may be applied for a multi-layer optical disk having two or more information recording layers.

In the optical disk field in recent years, there has been a demand for increases in capacity for information recording. In order to increase the capacity for information recording, a multi-layer optical disk having multiple information recording layers is considered promising (see JP-A-2003-91868). Especially, an optical disk having two information recording layers (which is referred to as a two-layer optical disk, hereinafter) is in actual use and offers promise.

A high-density optical disk has a recording capacity of about 25 Gbyte in one-sided and single-layer. The high density optical disk allows an increase in capacity for information recording by adopting a wavelength of the light source as long as 405 nm and a numerical aperture (NA) of the objective as large as 0.85, for example, for a small spot diameter of the reading beam.

A high density two-layer optical disk has a recording capacity of 50 Gbyte in one-sided two layers. The high density two-layer optical disk has L0 and L1 layers. The L0 layer is an information recording layer, which is a reference layer, at a depth of 0.1 mm (100 μm) in the direction of incidence of laser light. The L1 layer is an additional information recording layer at a depth of 75 μm.

In order to form a substrate first in a method for manufacturing a two-layer optical disk, pits and projections of the L0 layer are formed on one main surface thereof, and a middle layer of an ultraviolet curing resin is formed on the L0 layer. The L1 layer is formed on the middle layer.

Emboss Process and 2P (Photo Polymerization) Process have been proposed as methods for forming the L1 layer. The Emboss Process and 2P Process are described below.

[Emboss Process]

A Pressure Sensitive Adhesive (PSA) film or a UV-curable PSA film is laminated on the first layer of a substrate, and a stamper is brought into intimate contact thereon and is pressurized to transfer. In some cases, UV rays may be irradiated from the substrate or stamper side, and both, in intimate contact, may then be UV-cured. After that, the stamper is peeled off from the substrate, and the pits and projections of the L1 layer are thus formed.

[2P Process]

A substrate and a stamper are faced against each other, and an ultraviolet curing resin is filled between the first layer of the substrate and the stamper. Then, under this state, they are UV-cured. After that, the stamper is peeled off from the substrate, and the pits and projections of the L1 layer are thus formed.

However, the Emboss Process and the P2 Process have problems as described below.

[Emboss Process]

The material costs of the PSA film or UV-curable PSA film are high, and the storage of the materials needs maintenance in order to prevent the distortion of the materials. The PSA film or UV-curable PSA film is formed through steps of uniform thickness coating on a peeled film and solvent uniform drying, for example, which may increase the constraints for materials and also increase the scale of manufacturing. The compatibility of the second layer between hardness as a transfer layer for holding transfer signals and the adhesiveness to the substrate is difficult.

Figure 8A:
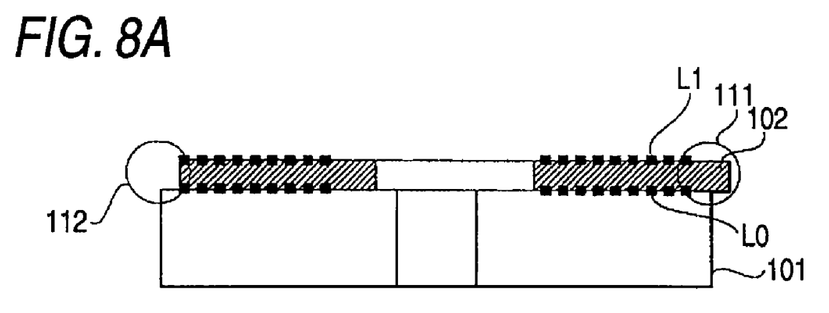
FIGS. 8A and 8B are schematic diagrams for describing problems of Emboss Process and 2P Process.

Furthermore, as shown in FIG. 8A, a film 102 may be bonded on a substrate 101 out of place. A projection 111 due to the displacement in bonding has adverse effects as described below:

(a) the projection 111 causes the resulting optical disk to fall out of spec;
(b) the resulting optical disk may be easily deformed;
(c) problems may occur in subsequent manufacturing processes; and
(d) the resulting disk in the final form may peel because the overhanging part can be easily caught.

A recess 112 due to the displacement in bonding has adverse effects as described below:

(a) the transferability of the outer circumference is not enough;
(b) the servo becomes instable; and
(c) the corrosion of the upper and lower recording films may be easily induced or accelerated.

Furthermore, the adoption of a method in which the film diameter and the recording area, which is an area having the L0 layer and L1 layer, are reduced in order to prevent the displacement in bonding and the outer circumference of the disk is not used, contradicts the increase in capacity, which may sacrifice a desired recording density.

[2P Process]

Figure 8B:
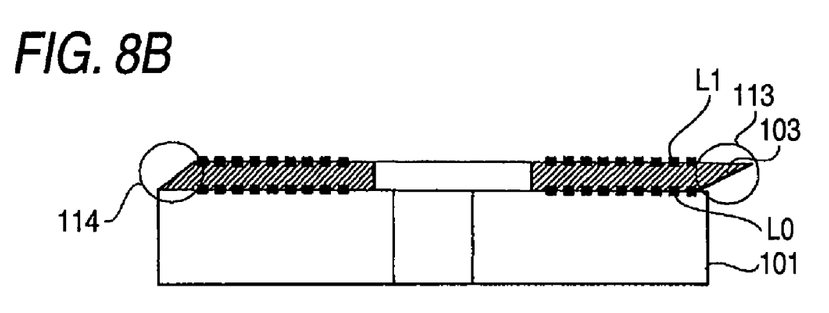

As shown in FIG. 8B, since an ultrasonic curing resin 103 to be coated over the substrate 101 is liquid, it is difficult to form and maintain a uniform thickness before UV curing, which may cause unevenness in thickness. The shrinkage by UV-curing may cause a large skew of the substrate 101. The amount of ultraviolet curing resin filled between a substrate and a stamper is difficult to control. An excessive amount thereof may cause an outer burr 113 easily while an insufficient amount thereof may catch air bubbles easily and may cause a bubble caught part 114. It is difficult to have the compatibility of the second layer between the hardness as the transfer layer for holding transfer signals and the adhesiveness to the substrate.

Accordingly, an optical disk manufacturing method, which has good transferability and substrate adhesiveness, can reduce the skew of the optical recording medium and can manufacture a high quality optical disk is desired.

SUMMARY

According to an embodiment, there is provided a method for manufacturing an optical disk having a middle layer on a substrate, the method including:

coating an ultraviolet curing resin over the substrate;

irradiating ultraviolet rays to the ultraviolet curing resin and prepolymerizing the ultraviolet curing resin; and forming the middle layer by pressing a stamper against the prepolymerized ultraviolet curing resin, irradiating ultraviolet rays to the ultraviolet curing resin and thus curing the ultraviolet curing resin.

According to another embodiment, there is provided a method for manufacturing an optical disk having a stack of one or more other middle layers on one middle layer on a substrate, the method including:

coating an ultraviolet curing resin over the one middle layer or the other middle layer;

irradiating ultraviolet rays to the ultraviolet curing resin and prepolymerizing the ultraviolet curing resin; and forming the other middle layer by pressing a stamper against the prepolymerized ultraviolet curing resin, irradiating ultraviolet rays to the ultraviolet curing resin and thus curing the ultraviolet curing resin.

In the embodiments, ultraviolet rays are irradiated to an ultraviolet curing resin, and the ultraviolet curing resin is prepolymerized against which a stamper is pressed. Though the surface of the prepolymerized ultraviolet curing resin has an improved resin viscosity, it is still liquid, which has sufficient flexibility, conformability and wetness and can provide good transferability.

In the embodiments, an ultraviolet curing resin is prepolymerized by irradiating ultraviolet rays to the ultraviolet curing resin before a stamper is pressed thereagainst. Though shrinkage by curing of the ultraviolet resin may occur, the stress due to the shrinkage by curing may be more alleviated since the stamper has not been pressed thereagainst yet. Next, ultraviolet rays are irradiated with the stamper pressed against the prepolymerized ultraviolet curing resin so that the ultraviolet curing resin is more cured. Since the curing occurs after the ultraviolet curing resin is prepolymerized, the effective shrinkage by curing having an effect on the form of the disk may be reduced, which can reduce the skew of the optical disk.

According to the embodiments, a high quality optical disk can be manufactured which has good transferability of information signals and adhesiveness to the substrate and the reduced skew of the optical disk.

Additional features and advantages are described herein, and will be apparent from, the following Detailed Description and the figures.

DETAILED DESCRIPTION

Figure 1:
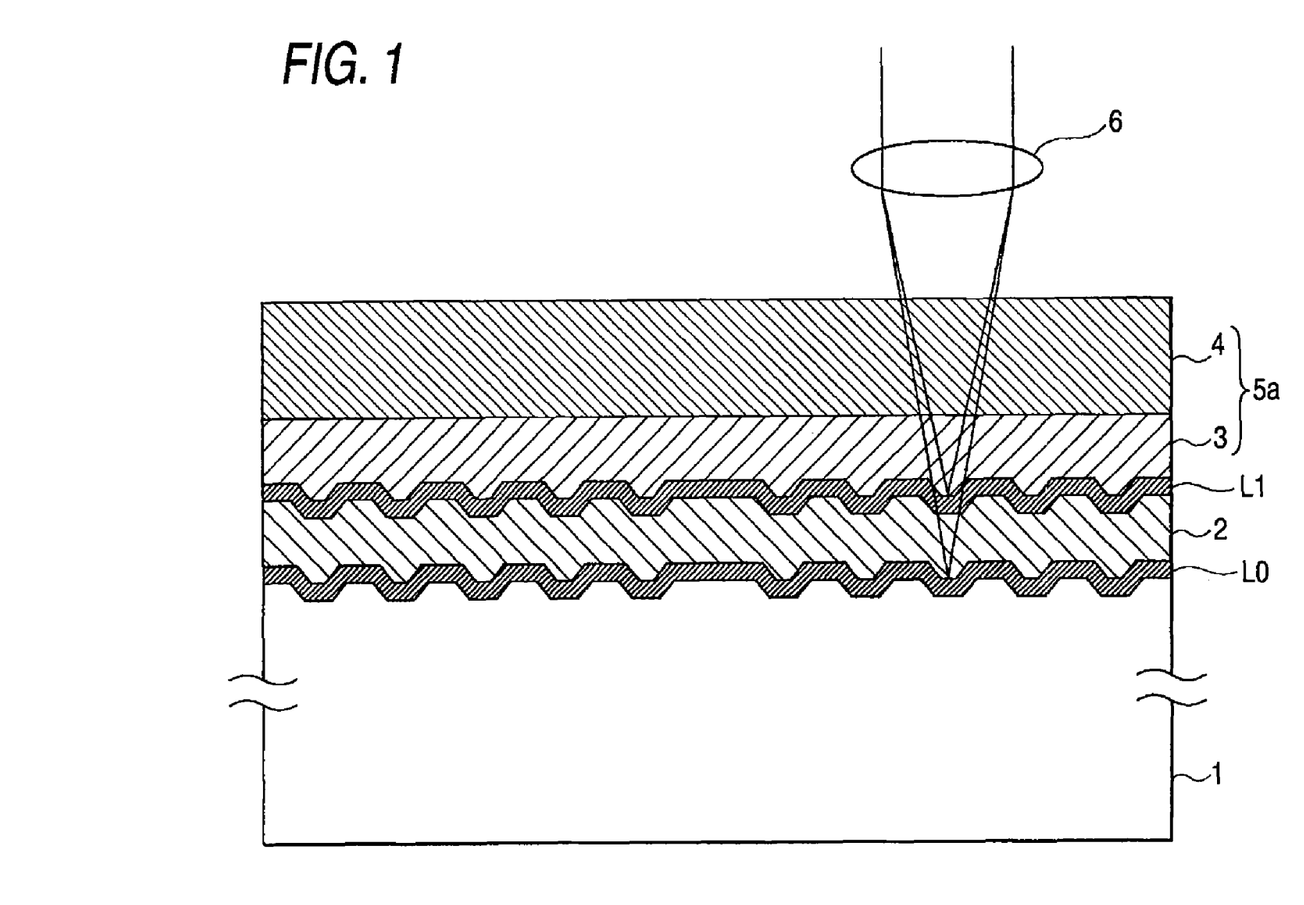
FIG. 1 is a section diagram showing an example of an optical disk according to an embodiment.

With reference to drawings, embodiments are described below. With reference to FIG. 1, an example of an optical disk to which a manufacturing method according to an embodiment is described.

FIG. 1 shows a construction of an example of an optical disk to which an optical disk manufacturing method, according to an embodiment, is applicable. Information signals are written and read to and from the optical disk by irradiating laser light to an information recording layer thereof. Information signals are written or read to or from the optical disk by gathering laser light having a wavelength of 400 nm to 410 nm through an objective 6 having a numerical aperture of 0.84 to 0.86 and irradiating the light from a cover layer 5a side to one of L0 and L1 layers, which are information recording layers.

The optical disk has a structure having a sequential stack of an L0 layer, middle layer 2, an L1 layer and the cover layer 5a on a substrate 1. The cover layer 5a has an adhesive layer 3 having a thickness of 15 μm and a polycarbonate sheet 4 having a thickness of 60 μm, for example.

The material of the substrate 1 may be a resin material such as a polycarbonate resin, poly olefin resin or acrylic resin or glass. However, in consideration of costs and so on, the use of a resin material is preferable. The resin material may be ZEONEX or polycarbonate, for example.

The method for forming the substrate 1 is only beneficial to provide a desired form and optically sufficient smoothness on the substrate surface and is not limited in particular. For example, Injection Process or Photopolymer (2P) Process using an ultraviolet curing resin may be used.

Each of the L0 and L1 layers, which are information recording layers, refer to a layer including a reflective film and a recording film, for example, on projections and pits of the substrate 1. The L0 and L1 layers may be reflecting films containing Au (gold), Ag (silver), an Ag alloy, Al (Aluminum) or an Al alloy, for example, when the optical disk is of the read-only type. When the optical disk is of the write-once type, the optical disk may include a sequential stack of a reflective film and a recording layer containing an organic dye material, for example. When the optical disk is of the rewritable type, the optical disk may include a sequential stack of a reflective film, a lower dielectric layer, a phase change recording layer and upper dielectric layer, for example.

A middle layer 2 having a thickness of 25 μm, for example, is formed on the L0 layer formed on the substrate 1. The L1 layer is provided on the middle layer 2. The middle layer 2 may contain an ultraviolet curing resin.

The cover layer 5a is formed on the L1 layer on the middle layer 2. The cover layer 5a is for the purpose of protection of the optical disk. Information signals may be written/read by gathering laser light to the information recording layers through the cover layer 5a, for example.

The cover layer 5a may contain an adhesive layer and a polycarbonate sheet, an ultraviolet curing resin, or an ultraviolet curing resin and a polycarbonate sheet. The cover layer 5a may have a thickness of approximately 75 μm, for example, and includes the adhesive layer 3 having a thickness of 15 μm and the polycarbonate sheet 4 having a thickness of 60 μm, for example.

Figure 2A:
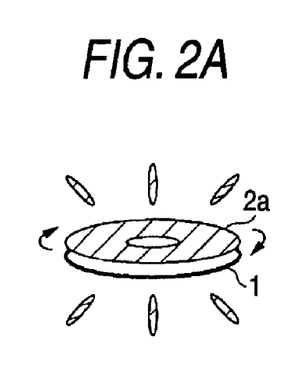
FIGS. 2A to 2D are schematic diagrams for schematically describing an optical disk manufacturing method according to an embodiment.

Next, an optical disk manufacturing method according to an embodiment will be described. With reference to FIGS. 2A to 2D, a method for forming the middle layer 2 is schematically described. According to an embodiment, as illustrated in FIG. 2A, a liquid ultraviolet curing resin 2a is dropped over the substrate 1, and the substrate 1 is rapidly spun so that the liquid ultraviolet curing resin 2a can be extended over the substrate 1.

Figure 2B:
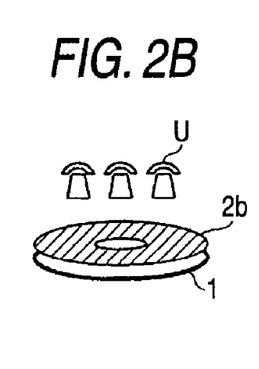

Next, as shown in FIG. 2B, ultraviolet rays are irradiated by an ultraviolet ray irradiator U, whereby the liquid ultraviolet curing resin 2a becomes a prepolymerized ultraviolet curing resin 2b. The amount of UV irradiation in this case is selected from an optimum range for hardness that can provide good transferability and adhesiveness.

More specifically, an optimum amount of UV irradiation for the prepolymerization of a general ultraviolet curing resin having an absorbing area near a wavelength of 360 nm, for example, is defined by the strength of irradiation and total amount of light. The strength of irradiation ranges from 5% to 50% of the amount for complete curing, and preferably ranges from 10% to 40%. The total amount of light ranges from 5% to 50% of the amount for complete curing and preferably ranges from 7% to 30%.

As described above, the strength of irradiation is defined because it has a large effect on the cured state of the surface of the ultrasonic curing resin. If the strength of irradiation is lower than a proper range, the prepolymerization does not advance, and the original liquid state does not change. If the strength of irradiation is higher than the proper range, the outermost surface of the ultrasonic curing resin has a harder coating than that of inside, which has an adverse effect in a transferring step as a result, and prevents the cleavage and defoam of bubbles caused by the transferring step.

Furthermore, as described above, the total amount of light is defined because it has a large effect on the cured state of an ultraviolet curing resin. If the total amount of light is too low, the ultraviolet curing resin becomes too soft, and the distribution of thickness of the film, uniformly coated in advance by the pressure of the transferring step, may be deteriorated by the movement of the ultraviolet curing resin. If the total amount of light is too high, the ultraviolet curing resin becomes too hard, which deteriorates the transferability. Furthermore, bubbles may be caught therein when a stamper is pressed thereagainst, and the movement of the bubbles to the outside of the signal area and the cleavage and defoam of the bubbles are prevented.

More specifically, the optimum amount of UV irradiation of a general ultraviolet curing resin to be used for manufacturing an optical disk, which may need a strength of irradiation of 200 mW/cm$^2$ and a total amount of light of 1000 mJ/cm$^2$ for complete curing, ranges from 10 mW/cm$^2$ to 100 mW/cm$^2$ and preferably ranges from 20 mW/cm$^2$ to 80 mW/cm$^2$. The optimum total amount of light resulting from the selection of the time of irradiation with the strength of irradiation ranges from 50 mJ/cm$^2$ to 500 mJ/cm$^2$ and preferably ranges from 70 mJ/cm$^2$ to 300 mJ/cm$^2$.

Figure 2C:
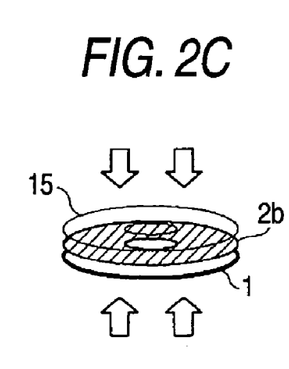
Figure 2D:
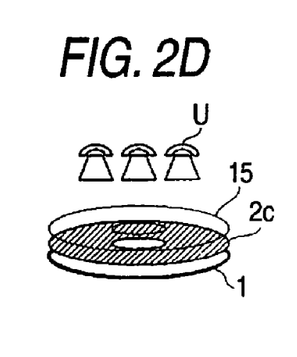

Next, as illustrated in FIG. 2C, a stamper 15 containing a translucent resin is pressed against the prepolymerized ultraviolet curing resin 2b. Next, as shown in FIG. 2D, ultraviolet rays are further irradiated to the prepolymerized ultraviolet curing resin 2b, which results in a completely cured ultraviolet curing resin 2c. Through the steps described above, the middle layer 2 is formed.

Figure 3A:
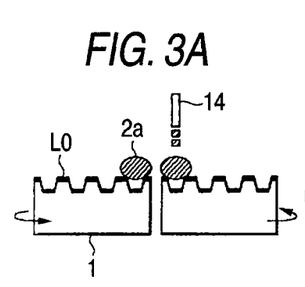
FIGS. 3A to 3K are schematic diagrams for describing an optical disk manufacturing method according to an embodiment.

Next, an example of the optical disk manufacturing method according to an embodiment of the invention will be described in more detail. FIGS. 3A to 3K schematically show an optical disk manufacturing method according to an embodiment of the invention. First of all, as shown in FIG. 3A, the liquid ultraviolet curing resin 2a is dropped from an ultraviolet curing resin supplying device 14 to one main surface of the substrate 1 having the L0 layer substantially at the center of the L0 layer by rotating the substrate 1 at the same time.

In this case, the dropping process by rotating the substrate 1 at the same time may cause centrifugal force in the ultraviolet curing resin 2a, and the ultraviolet curing resin 2a to spread uniformly from the middle circumference to the outer circumference of the substrate 1. Thus, the ultraviolet curing resin 2a can be evenly coated over the substrate 1.

Here, the process for coating the ultraviolet curing resin 2a is not limited to spin-coating but may include other processes. In particular, roll-coating, die-coating, dip-coating, spray coating and casting may be used, for example.

Figure 3B:
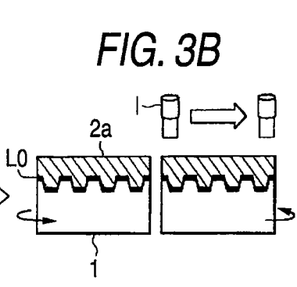

Next, as illustrated in FIG. 3B, an IR (infrared ray) irradiator I is operated to move from the inner circumference to the outer circumference, and, at the same time, to irradiate infrared rays to the ultraviolet curing resin 2a. The irradiation of infrared rays can increase the temperature distribution of the disk from the inner circumference to the outer circumference and can control the viscosity for improved flatness.

Figure 3C:
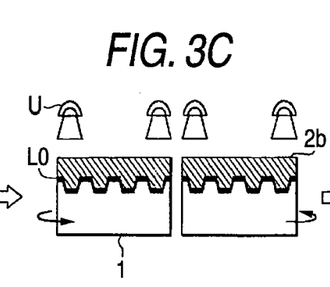

Next, as illustrated in FIG. 3C, ultraviolet rays are irradiated by the ultraviolet rays irradiator U, whereby the liquid ultraviolet curing resin 2a can become the prepolymerized ultraviolet curing resin 2b. The amount of irradiation of ultraviolet rays in this case is adjusted to a proper range.

Figure 3D:
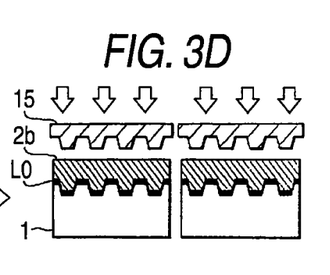

Next, as illustrated in FIG. 3D, the stamper 15 is pressed against the prepolymerized ultraviolet curing resin 2b. For example, the stamper 15 is a transparent resin stamper allowing light to pass through and has projections and pits for transfer on one main surface thereof.

Pressing the stamper 15 against the prepolymerized ultraviolet curing resin 2b forms projections and pits on one main surface of the ultraviolet curing resin 2b. Since the method for pressing the stamper 15 against the prepolymerized ultraviolet curing resin 2b will be described later, the detail description is omitted here.

Figure 3E:
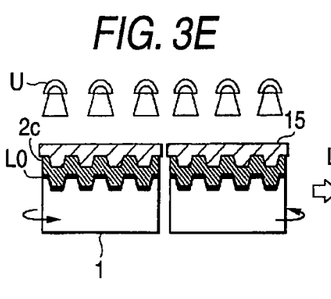
Figure 3F:
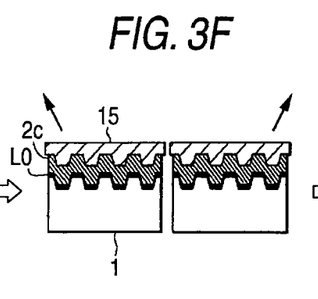
Figure 3G:
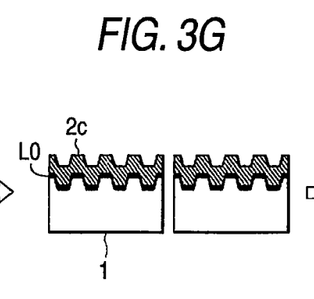

Next, as illustrated in FIG. 3E, ultraviolet rays are irradiated by the ultraviolet ray irradiator U to the stamper 15 and pressed against the ultraviolet curing resin 2b. Thus, the prepolymerized ultraviolet curing resin 2b becomes the completely cured ultraviolet curing resin 2c. Next, as illustrated in FIG. 3F, the stamper 15 is peeled off from the completely cured ultraviolet curing resin 2c. Thus, as illustrated in FIG. 3G, projections and pits are formed on the ultraviolet curing resin 2c.

Figure 3H:
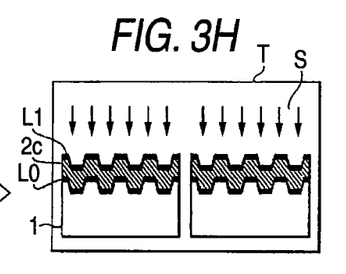

Next, as illustrated in FIG. 3H, a recording film and a reflective film, for example, are formed on the projections and pits by sputtering, for example, within a vacuum chamber T. The letter "S" in FIG. 3H indicates the direction of incidence of sputtered atoms. A recording film and/or reflective film, for example, may be formed on the projections and pits in accordance with the read-only optical disk, write-once optical disk and rewritable optical disk. The film structure depends on the type of optical disk, and the forming process may be vapor deposition rather than sputtering.

Figure 3I:
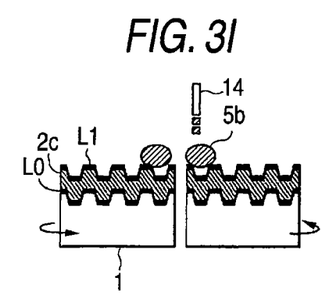

Next, as illustrated in FIG. 3I, a liquid ultraviolet curing resin 5b is dropped over the formed recording film and/or reflective film by using the ultraviolet curing resin supplying device 14. The substrate 1 is spun fast so that the liquid ultraviolet curing resin 5b can be extended all over the ultraviolet curing resin 2c on the substrate 1.

Figure 3J:
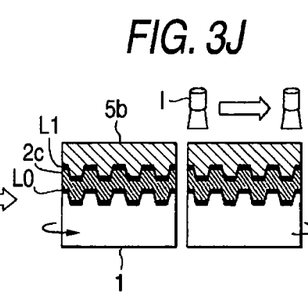

Next, as illustrated in FIG. 3J, the substrate 1 is rotated, and, at the same time, infrared rays are irradiated to the ultraviolet curing resin 5b by using the IR irradiator I and by operating the IR irradiator I to move from the inner circumference to the outer circumference. Thus, the smoothness of the ultraviolet curing resin 5b can be promoted.

Figure 3K:
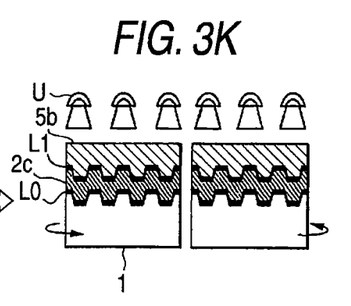

Next, as illustrated in FIG. 3K, ultraviolet rays are irradiated to the ultraviolet curing resin 5b by using the ultraviolet ray irradiator U, whereby the ultraviolet curing resin 5b is completely cured. Through the process above, the high density optical disk according to an embodiment can be manufactured.

Figure 4A:
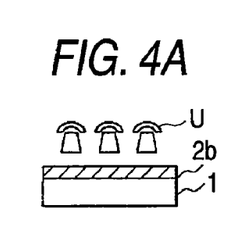
FIGS. 4A to 4D are schematic diagrams for describing first to third transferring methods.
Figure 4B:
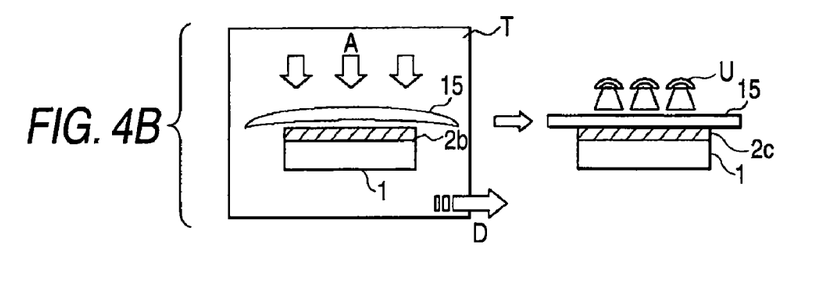
Figure 4C:
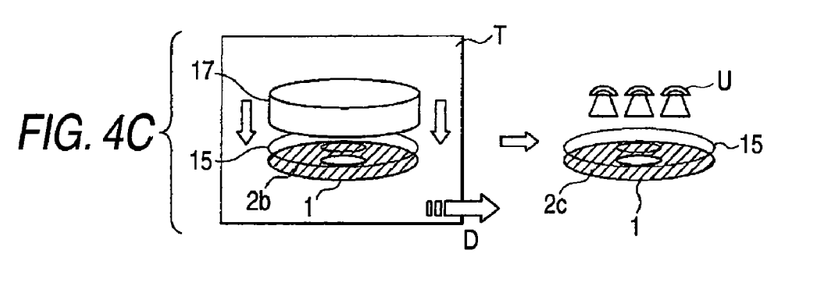
Figure 4D:
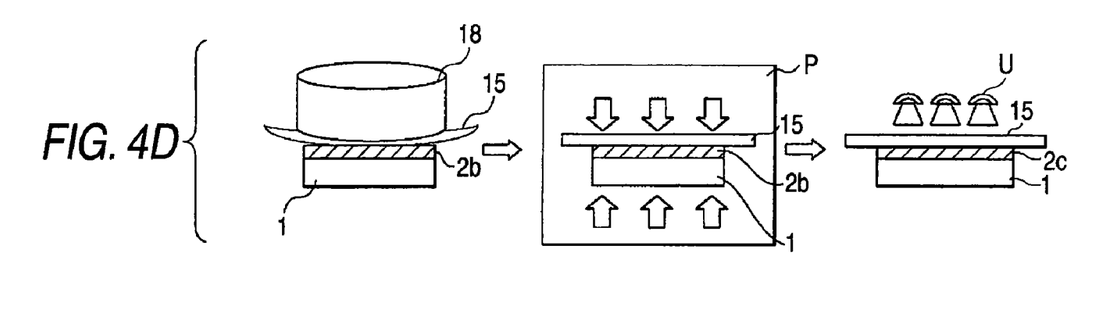

Next, with reference to FIGS. 4A to 4D, a method (which may be called a transferring method, herein) for pressing the stamper 15 against the prepolymerized ultraviolet curing resin 2b according to an embodiment will be described. FIG. 4A schematically shows a step of prepolymerizing the liquid ultraviolet curing resin 2a by irradiating ultraviolet rays thereto. FIGS. 4B to 4D schematically show first to third examples of the transferring method.

In the first example of the transferring method, as illustrated in FIG. 4B, a differential pressure laminating method is used to press the stamper 15 against the prepolymerized ultraviolet curing resin 2b. Here, the differential pressure laminating method is a method in which the stamper 15 is pressed against the ultraviolet curing resin 2b by using a pressure difference caused between a vacuumed state and a state having the application of atmospheric pressure.

In the differential pressure laminating method, the center opening of the stamper 15 before pressed against the substrate 1 is fitted into a small diameter part (not shown) of the end of a centering pin included in an inner supporting mechanism. The outer circumferential side of the stamper 15 is supported by an outer supporting mechanism (not shown). The stamper 15 is placed within the vacuum chamber T under vacuum after vacuum bagging D such that the inner supporting mechanism and outer supporting mechanism can position the stamper 15 apart from the substrate 1 by an appropriate space and that one main surface of the stamper 15 and one main surface of the substrate can face against each other substantially in parallel.

Next, the atmospheric pressure is opened by breaking the vacuum within the vacuum chamber T after the vacuum bagging D, and differential pressure A between the vacuum and the atmospheric pressure is applied to the stamper 15. In this case, in synchronization with the opening of the atmospheric pressure, the holding state of the inner supporting mechanism and outer supporting mechanism for holding the space between the stamper 15 and the substrate 1 is released. The opening of the atmospheric pressure and the release of the inner supporting mechanism and outer supporting mechanism in synchronization with the opening of the atmospheric pressure bends the middle circumference of the stamper 15 downward to press against the substrate 1, whereby generation of bubbles can be reduced. After that, ultraviolet rays are irradiated by using the ultraviolet ray irradiator U, and the ultraviolet curing resin 2b is completely cured.

In the second example of the transferring method, as illustrated in FIG. 4C, a pasting-under-vacuum method is adopted to press the stamper 15 against the prepolymerized ultraviolet curing resin 2b. In the pasting-under-vacuum method, pressure is applied to the stamper 15 by a pressurizer 17 within the vacuum chamber T after the vacuum bagging D, whereby the stamper 15 is pressed against the ultraviolet curing resin 2b. Thus, the projections and pits of the stamper 15 are transferred to the ultraviolet curing resin 2b. After that, ultraviolet rays are irradiated thereto by using the ultraviolet ray irradiator U, and the ultraviolet curing resin 2b is thus completely cured.

In the third example of the transferring method, as illustrated in FIG. 4D, a pad crimp-pressurize debubbling method is adopted for pressing the stamper 15 against the prepolymerized ultraviolet curing resin 2b. In the pad crimp-pressurize debubbling method, after the stamper 15 is pressed against the prepolymerized ultraviolet curing resin 2b, pressure is applied thereto by a pressure pad 18 from the above of the stamper 15, and pressure is applied thereto within a pressure chamber P, whereby the transferability is further improved. After that, ultraviolet rays are irradiated thereto by using the ultraviolet ray irradiator U, and the ultraviolet curing resin 2b is thus completely cured.

Having described the first to third examples of the transferring method, the transferring method applicable to an embodiment is not limited to the first to third examples. For example, a roller crimping method is applicable.

Next, a UV irradiation condition for optimum prepolymerization will be described more specifically. Ultraviolet rays at an irradiation strength of 50 mW/cm$^2$ were irradiated to an ultraviolet curing resin A (Tg: 60° C.), an ultraviolet curing resin B (Tg: 30° C.), an ultraviolet curing resin C (Tg: 90° C.) and an ultraviolet curing resin D (Tg: 140° C.), and the irradiation times and the pendulum hardnesses against the irradiation times were measured. The pendulum hardnesses were measured by placing a pendulum so that the axis could be positioned near r=35 mm of the ultraviolet curing resins coated over a PC substrate and under a condition of N=5.

Figure 5:
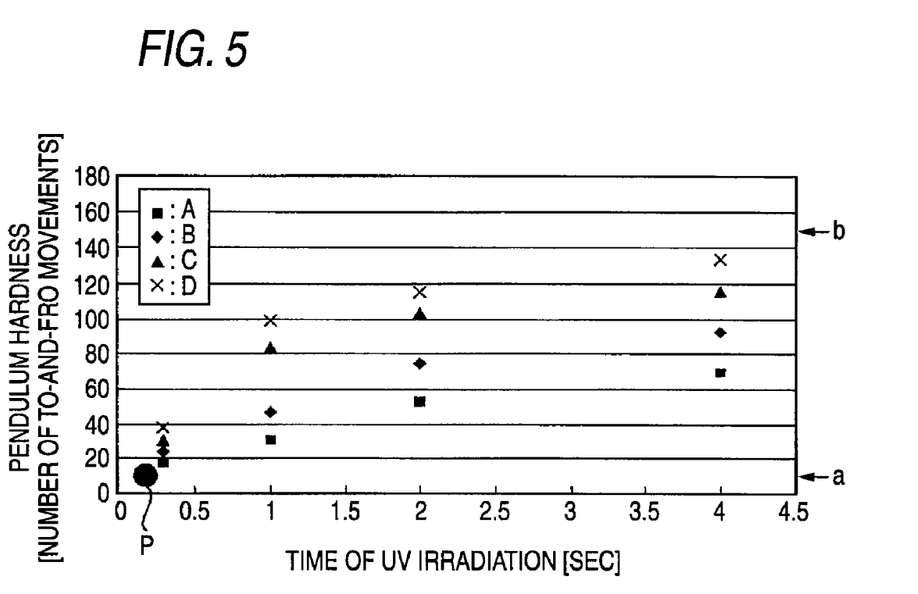
FIG. 5 is a graph plotting pendulum hardnesses against times for irradiation of ultraviolet rays.

FIG. 5 shows the measurement results. Here, in FIG. 5, the pendulum hardness indicated by the arrow a is an optimum hardness of the prepolymerized ultraviolet curing resin, and the pendulum hardness indicated by the arrow b is the hardness of the completely cured ultraviolet curing resin. The area P is an area providing a prepolymer with the optimum hardness.

According to an embodiment, the amount of irradiation for prepolymerizing an ultraviolet curing resin with the optimum hardness is defined by the irradiation strength and total amount of light. The irradiation strength for the optimum hardness ranges from 5% to 50% of the amount for complete curing and preferably ranges from 10% to 40% thereof. The total amount of light ranges from 5% to 50% of the amount for complete curing and preferably ranges from 7% to 30%.

Figure 6A:
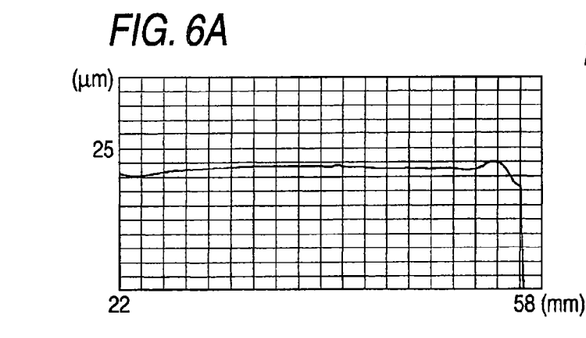
FIGS. 6A to 6D are section diagrams showing distributions of thicknesses of ultraviolet curing resins.
Figure 6B:
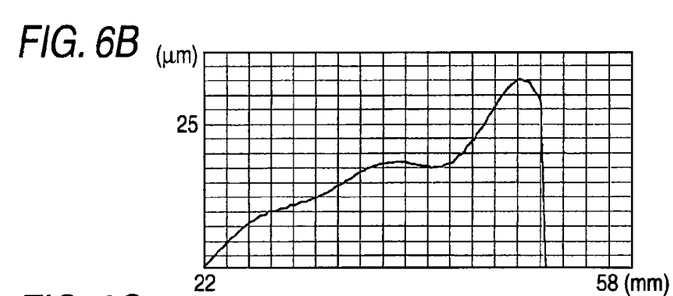
Figure 6C:
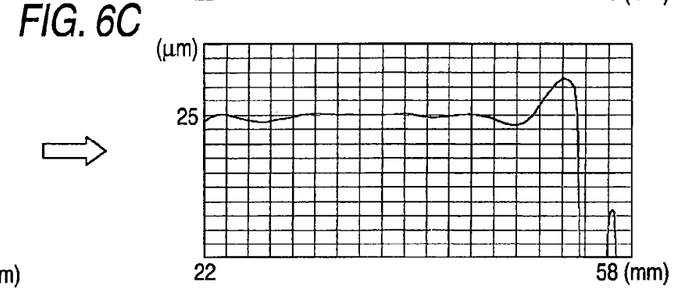
Figure 6D:
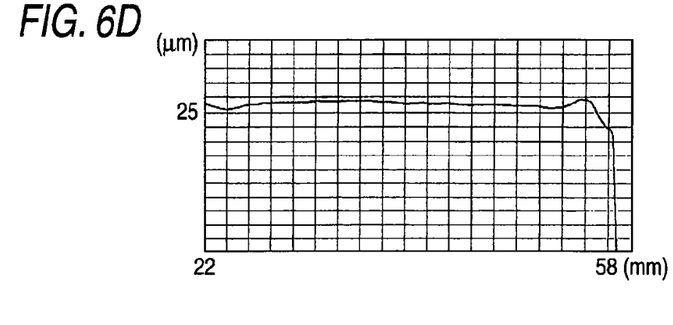

The optimum amount of ultraviolet rays to be irradiated is selected based on the transferability of the projections and pits of a stamper and the distribution of thickness of the middle layer after the transferring process. FIGS. 6A to 6D show examples of changes in distribution of thickness depending on the amount of UV irradiation. FIG. 6A shows a distribution of thickness of a section of an ultraviolet curing resin before a stamper is pressed thereagainst. FIGS. 6B to 6D show distributions of thicknesses of a section of an ultraviolet curing resin after the ultraviolet curing resin is completely cured by farther irradiating ultraviolet rays to the ultraviolet curing resin.

FIG. 6D shows a distribution of the thickness of a section of an ultraviolet curing resin after the ultraviolet curing resin is completely cured by pressing a stamper against the ultraviolet curing resin prepolymerized by irradiating ultraviolet rays at a strength of irradiation in an optimum range and at a total amount of light in an optimum range and further irradiating ultraviolet rays to the ultraviolet curing resin. As illustrated in FIG. 6D, the thickness is uniform, and the skew of the disk caused by the stress due to the shrinkage by curing of the ultraviolet curing resin can be reduced.

FIGS. 6B and 6C show distributions of thicknesses of a section of an ultraviolet curing resin after a stamper is pressed against the ultraviolet curing resin cured by the amount of irradiation in an optimum range. The ultraviolet curing resins illustrated in FIGS. 6B and 6C are cured by smaller amounts of irradiation than the optimum amount of irradiation. As illustrated in FIGS. 6B and 6C, the thicknesses vary more than that of the prepolymer illustrated in FIG. 6D.

An embodiment provides following advantages. For example, a flattened form can be maintained in a signal transfer process from a stamper by vacuum laminating, roller crimping or pad crimping, for example. Though the viscosity of the resin increases, the surface after prepolymerization is still in a liquid state and has sufficient flexibility, conformability and wetness, which can provide improved transferability. Furthermore, the stress due to the shrinkage by curing is alleviated, which can reduce the skew of the optical disk.

Figure 7:
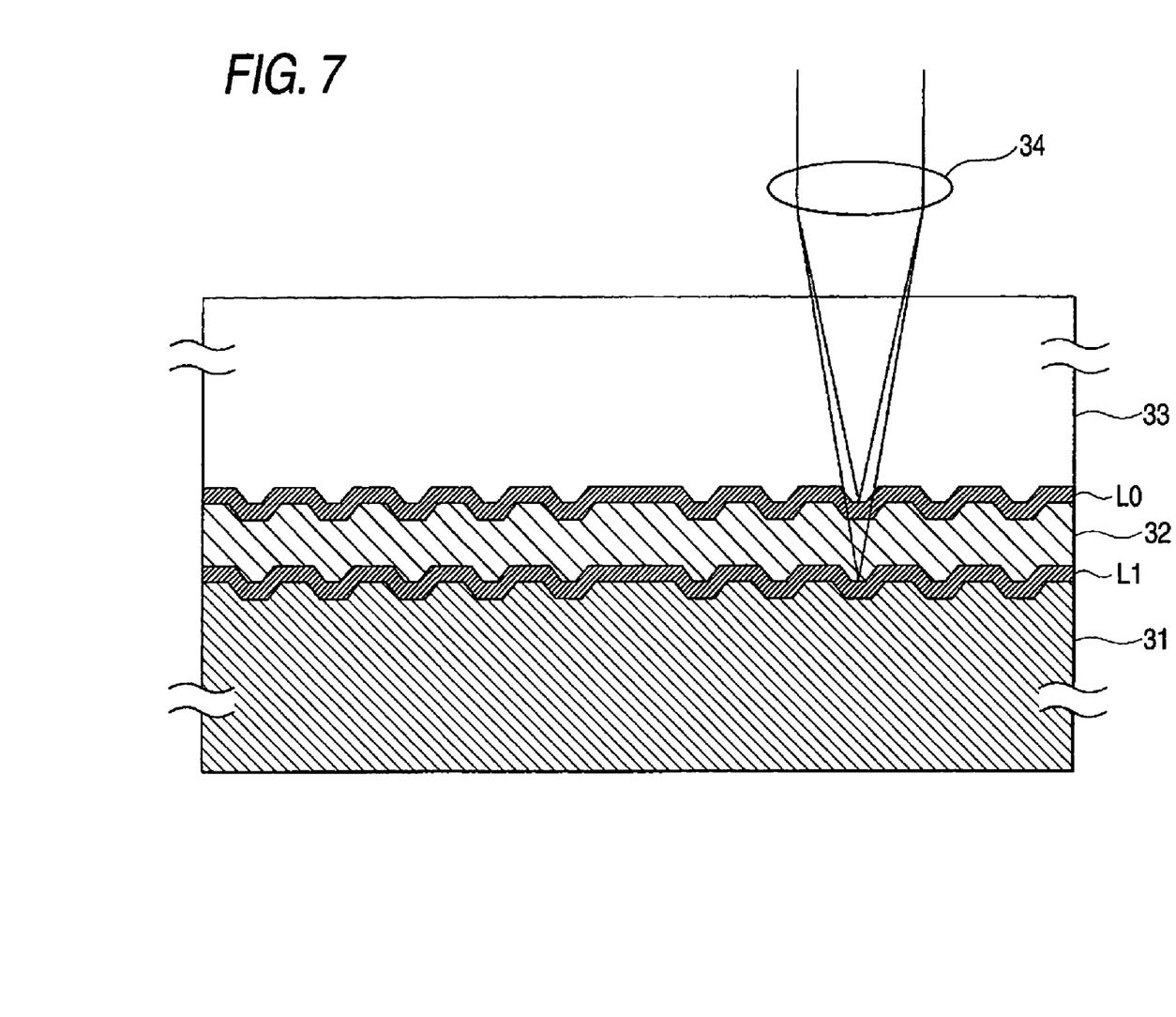
FIG. 7 is a section diagram showing another example of the optical disk according to an embodiment.

Having described the high density optical disk having a sequential stack of the L0 layer, middle layer, L1 layer and cover layer on the substrate according to this example, the embodiments are not limited to the example. For example, as shown in FIG. 7, the embodiments are also applicable to an optical disk having the stack of a first substrate 31, an L1 layer, a middle layer 32, an L0 layer and a second substrate 33. The first substrate 31 and the second substrate 33 may contain PC, for example. The middle layer 32 may contain an ultraviolet curing resin and has a thickness of 50 μm.

Information signals can be written/read to/from the optical disk shown in FIG. 7 by irradiating laser light from the second substrate 33 side to the information recording layers, for example. For example, information signals can be written and read by gathering laser light having a wavelength of 650 nm to 665 nm by an objective lens 34 having a numerical aperture of 0.64 to 0.66 and irradiating the light to the L0 layer and L1 layer, which are information recording layers, from the second substrate 33 side.

The embodiments are not limited to the example, but various modifications may occur without departing from the scope and spirit of the invention. For example, having described the method for manufacturing an optical disk having one middle layer on the substrate, the invention is not limited thereto. For example, the invention is applicable to an optical disk having a stack of one or more other middle layers on one middle layer on the substrate.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for manufacturing an optical disk having a middle layer on a substrate, the method comprising:
    coating an ultraviolet curing resin over the substrate;
    irradiating infrared rays to the ultraviolet curing resin;
    irradiating ultraviolet rays to the ultraviolet curing resin and prepolymerizing the ultraviolet curing resin; and
    forming the middle layer by pressing a stamper against the prepolymerized ultraviolet curing resin, irradiating ultraviolet rays to the ultraviolet curing resin, thereby curing the ultraviolet curing resin,
    wherein the ultraviolet curing resin is prepolymerized by irradiating the ultraviolet rays to the ultraviolet curing resin at an intensity of irradiation ranging from 10% to 40% for completely curing the ultraviolet curing resin and ranging from 20 mW/cm$^2$ to 80 mW/cm$^2$, and with a total exposure of light ranging from 7% to 30% for completely curing the ultraviolet curing resin, and
    wherein pressing the stamper is conducted inside a vacuum chamber where an inner circumferential side of the stamper is supported by an inner supporting mechanism and an outer circumferential side of the stamper is supported by an outer supporting mechanism, and in synchronization with an atmospheric pressure being applied to the stamper a holding state of the inner and outer supporting mechanisms is released which bends a middle circumference portion of the stamper downward to press against the ultraviolet curing resin.

2. The method for manufacturing an optical disk according to claim 1, wherein a strength of the irradiation ranges from 70 to 300 mJ/cm$^2$.

3. The method for manufacturing an optical disk according to claim 1, wherein irradiating infrared rays to the ultraviolet curing resin includes focusing the infrared irradiation at an inner circumference of the optical disk and continuing irradiation outwardly to an outer circumference of the optical disk.

4. A method for manufacturing an optical disk having a stack of one or more other middle layers on one middle layer on a substrate, the method comprising the steps of:
    coating an ultraviolet curing resin over the one middle layer or the other middle layer;
    irradiating infrared rays to the ultraviolet curing resin;
    irradiating ultraviolet rays to the ultraviolet curing resin and prepolymerizing the ultraviolet curing resin; and
    forming the other middle layer by pressing a stamper against the prepolymerized ultraviolet curing resin, irradiating ultraviolet rays to the ultraviolet curing resin and thus curing the ultraviolet curing resin,
    wherein the ultraviolet curing resin is prepolymerized by irradiating the ultraviolet rays to the ultraviolet curing resin at an intensity of irradiation ranging from 10% to 40% for completely curing the ultraviolet curing resin and ranging from 20 mW/cm$^2$ to 80 mW/cm$^2$, and with a total exposure of light ranging from 7% to 30% for completely curing the ultraviolet curing resin, and
    wherein pressing the stamper is conducted inside a vacuum chamber where an inner circumferential side of the stamper is supported by an inner supporting mechanism and an outer circumferential side of the stamper is supported by an outer supporting mechanism, and in synchronization with an atmospheric pressure being applied to the stamper a holding state of the inner and outer supporting mechanisms is released which bends a middle circumference portion of the stamper downward to press against the ultraviolet curing resin.

5. The method for manufacturing an optical disk according to claim 4, wherein a strength of the irradiation ranges from 70 to 300 mJ/cm$^2$.

6. The method for manufacturing an optical disk according to claim 4, wherein irradiating infrared rays to the ultraviolet curing resin includes focusing the infrared irradiation at an inner circumference of the optical disk and continuing irradiation outwardly to an outer circumference of the optical disk.

* * * * *